(12) United States Patent
Kodorkin et al.

(10) Patent No.: US 8,799,900 B1
(45) Date of Patent: Aug. 5, 2014

(54) SHARING WEBCAM BETWEEN GUEST AND HOST OS

(75) Inventors: Alexander Kodorkin, Moscow (RU); Andrey Pokrovsky, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 249 days.

(21) Appl. No.: 13/448,443

(22) Filed: Apr. 17, 2012

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | | |
|---|---|---|---|---|
| 2003/0052886 A1* | 3/2003 | Naegle | ........................... | 345/501 |
| 2007/0242066 A1* | 10/2007 | Levy Rosenthal | ............. | 345/419 |
| 2009/0171999 A1* | 7/2009 | McColl et al. | ................. | 707/101 |
| 2009/0222814 A1* | 9/2009 | Astrand | ............................. | 718/1 |
| 2011/0137975 A1* | 6/2011 | Das et al. | ....................... | 709/203 |
| 2012/0057700 A1* | 3/2012 | Passera et al. | ................. | 380/201 |
| 2013/0286156 A1* | 10/2013 | Golas | .......................... | 348/14.08 |

OTHER PUBLICATIONS

Apple, QuickTime Video Effects and Transitions Guide, Jun. 1, 2009, Apple Inc.*

* cited by examiner

*Primary Examiner* — Emerson Puente
*Assistant Examiner* — Steven Do
(74) *Attorney, Agent, or Firm* — Bardmesser Law Group

(57) ABSTRACT

A system, method and computer program product for implementing a video camera that is accessible by different Virtual Machine GOSs and the Host system. A standard USB video camera is build into a Host system. A VM running a Guest OS is launched on the Host system. The Guest OS has virtual driver for the Host video camera. The virtual driver is connected to a virtual USB bus, which communicates with a special Host library over a Virtual Machine Monitor (VMM). A special Host side VM application acquires and processes video data from a standard Host system video processing API that communicates directly with a Host-side virtual camera driver. Video frames are provided via the Host-side VM application to the virtual USB bus and to the virtual driver. Host applications or other VMs can acquire video streams from the Host USB camera simultaneously.

21 Claims, 5 Drawing Sheets

SHARING WEBCAM BETWEEN GUEST AND HOST OS

BACKGROUND OF THE INVENTION

1. Field of Invention

The present invention relates to virtualization technology, and, more particularly to sharing a webcam between Guest and Host OSs.

2. Background Art

With Virtual Machine (VM) technology, a user can create and run multiple operating environments on a Host server at the same time. Each Virtual Machine requires its own guest operating system (GOS) and can run applications independently. The VMM software provides a layer between the computing, storage, and networking hardware and the software that runs on it.

Each VM acts as a separate execution environment, which reduces risk and allows developers to quickly re-create different operating system (OS) configurations or compare versions of applications designed for different OS's for as long as the integrity of data used by each of the VMs is provided. Generally, a Virtual Machine is an environment that is launched on a particular processor (a client machine) that is running a Host operating system (HOS) and the VM runs the Guest OS.

Modern computers have USB video cameras that are either built-in or external. However, providing the video camera to VM (GOS) and playing a video stream in a real time presents certain challenges, because once the camera is designated as associated with the VM GOS it cannot be used by the Host system.

An example of a conventional system that uses a USB camera on the Guest OS is depicted in FIG. 5. A Host 100 has a USB bus 103 with a video camera 104 connected to it. The Host 100 has a VM 107 running on it. The VM 107 has a Guest OS 108 running on it. The Guest OS 108 needs to use the USB video camera 104. The USB camera 104 is dedicated to the VM, and the Host has no access to it.

Thus, in a conventional system, the USB interface is not available in the Host, since it is used in VM.

Meanwhile, if the SKYPE application running on the Host 101 needs to use the video camera 104, it cannot have access to it. The conventional exemplary system monopolizes the use of video camera to a designated VM 107. Furthermore, any other GOSs cannot use the camera unless it is re-designated (i.e., switched over to another GOS). In other words, conventional virtualized systems only provide for exclusive use of the video camera. Once a VM uses the Host USB camera, other VMs cannot see this camera, and obviously cannot connect to it.

Furthermore, use of camera by different VMs (GOSs) required installation of special "boot up" drivers for each GOS on the Host. This is inconvenient for users and requires additional resources and associated costs for camera use. This problem becomes even more critical now, when many users require camera for communications over SKYPE or similar.

Accordingly, there is a need in the art for a system and method that allows for using a video camera by numerous Guest systems and the Host system without switching and installation of special drivers.

SUMMARY OF THE INVENTION

The present invention is directed to virtualization technology, and, more particularly to sharing a webcam between VM Guest OSs and Host OS that substantially obviates one or several of the disadvantages of the related art.

In one aspect, there is provided a system, method and computer program product for implementing a video camera that is accessible by different GOSs and the Host system.

According to an exemplary embodiment, a standard USB video camera is build into a Host system. A Virtual Machine running a Guest OS is launched on the Host system. The Guest OS has a standard driver (i.e., a virtual driver) for the Host video camera. The virtual driver is connected to a virtual USB bus, which communicates with a special Host library over a Virtual Machine Monitor (VMM).

A special Host-side VM application acquires and processes video data from a standard Host system video processing API that communicates directly with a Host-side camera driver. Video frames are provided via the Host-side VM application to the virtual USB bus and to the virtual driver. Meanwhile, Host applications or other VMs can acquire video streams from the Host USB camera.

Additional features and advantages of the invention will be set forth in the description that follows. Yet further features and advantages will be apparent to a person skilled in the art based on the description set forth herein or may be learned by practice of the invention.

The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
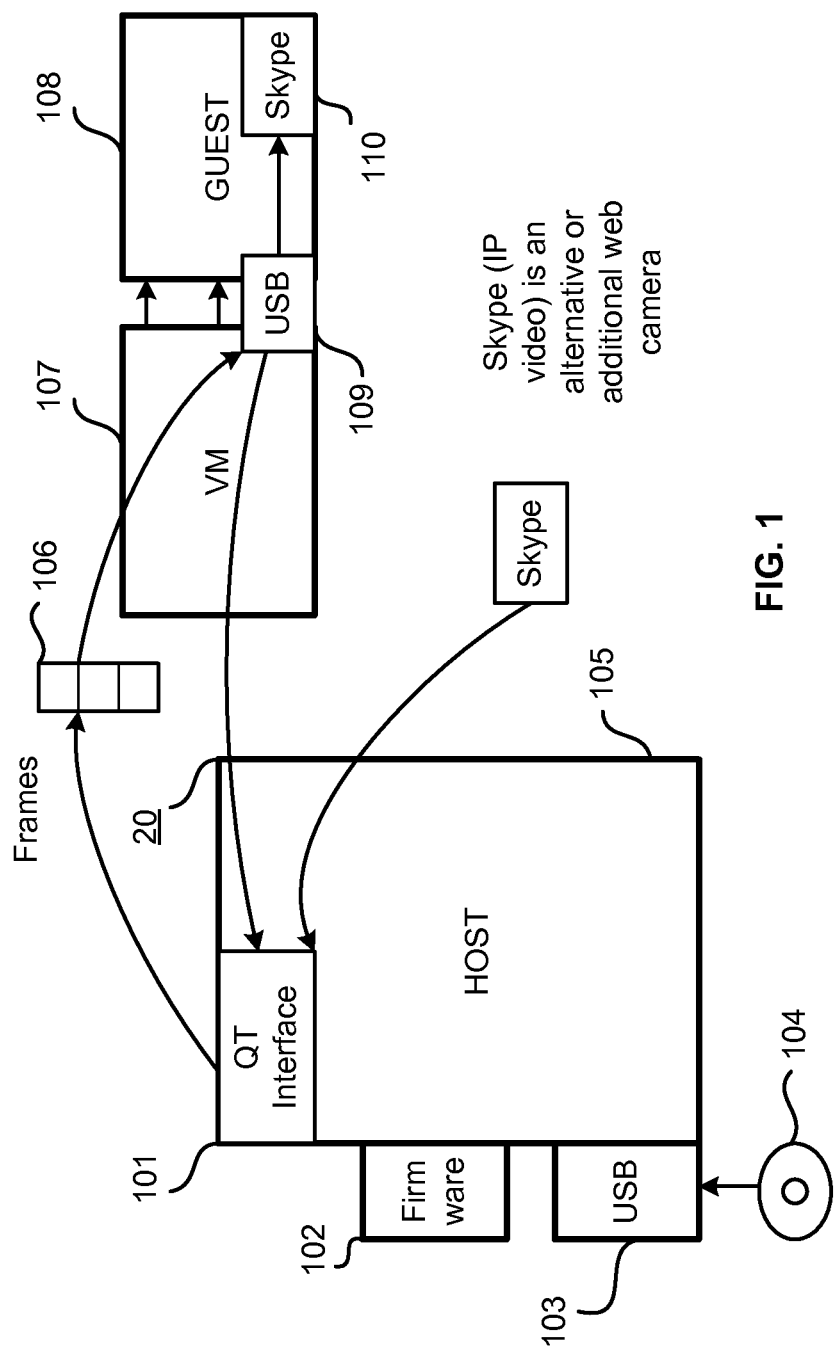
FIG. 1 illustrates a system providing for shared use of a USB video camera.

Reference will now be made in detail to the embodiments of the present invention, examples of which are illustrated in the accompanying drawings.

In one aspect, there is provided a system, method and computer program product for virtualization of a Host USB video camera on one or multiple VMs and making the Host USB video camera simultaneously accessible by different VM GOSs and by the Host system, without a reset and hardware re-assignment and re-binding.

According to the exemplary embodiment, a standard USB video camera is build into a Host system. At least one VM running a Guest OS is launched on the Host system. The Guest OS has a standard driver (i.e., a virtual driver) for the Host video camera. The virtual driver is connected to a virtual USB bus, which communicates with a special Quicktime (for example, or DirectShow, or similar) Host library over a Virtual Machine Monitor (VMM). The QuickTime Host library or "server" may have settings generalized for common VM usage. For example, a video format 640×480 30 fps may be specified as available. If the real camera gives 320×240×15, then each frame is doubled to increase the frame rate and increase the resolution by the virtualization drive. The VM gets frames in a format native for web-camera format of this VM. The frames from the QuickTime API are converted to USB camera emulated data. Since QT uses YUV color space, it might have to be converted to RGB color space or to another useful color space or compression method.

Another feature of the driver is triple buffering. Packets or frames from QT (or shared camera video server) API are converted for a particular client (VM) in appropriate frames (USB or FireWire). To enable transmission of frames from Host to VM, a file is created, which is mapped to a shared file system. The file is preferably mapped to RAM or another fast memory area, like an HDD cache.

The file has a header or metadata area and preferably three or possibly more data sectors. Each sector corresponds to the frame. The last frame read from Host and possibly the file stamp of the frame is reflected in the header. The VM might or might not write information about frames being read. If reading is critical, when VM gets periodically access to buffer for a long time, VM buffers frames from shared camera and transmits them as soon as the VM is connected. When the VM is suspended, the Host collects data. In this manner, the host writes frames to parts of buffers marked by VM as "free". Alternatively, the host writes frames cyclically, and the VM reads them whenever it can. Then, time stamps may be used for ordering the frames.

Triple buffering makes possible to avoid mutexes. The only restriction is that the frame being written cannot be read. This prevents reader from getting corrupted data.

Video frames may be generated or translated for each VM separately from each frame generated by Host video API, e.g., if the VMs request different frames quality. In realization particular embodiment, the VM can control camera hardware, and camera is not switched on until the VM requests video data.

A special Host side VM application acquires and processes video data from a standard Host system video processing API that communicates directly with a Host-side camera driver. Video frames are provided via the Host-side VM application to the virtual USB bus and to the virtual driver. Meanwhile, Host applications or other VMs can simultaneously acquire video streams from the Host USB camera.

An example of a system that uses a shared USB camera on the Guest OS is depicted in FIG. 1. A Host 100 has a USB bus 103 with a video camera 104 connected to it. The Host 100 has a standard set of firmware and QuickTime (QT)-push interface 101. The Host 100 has a VM 107 running on it. The VM 107 has a Guest OS 108 running on it. The Guest OS 108 needs to use the Host USB video camera 104. The Guest USB 109 request is pushed through to the Host QT interface 101. The Host QT-push interface 101 pushes video frames 106 from the camera 104 directly into the VM USB 109. Then the video stream is provided to SKYPE 110 (or another application).

Figure 2:
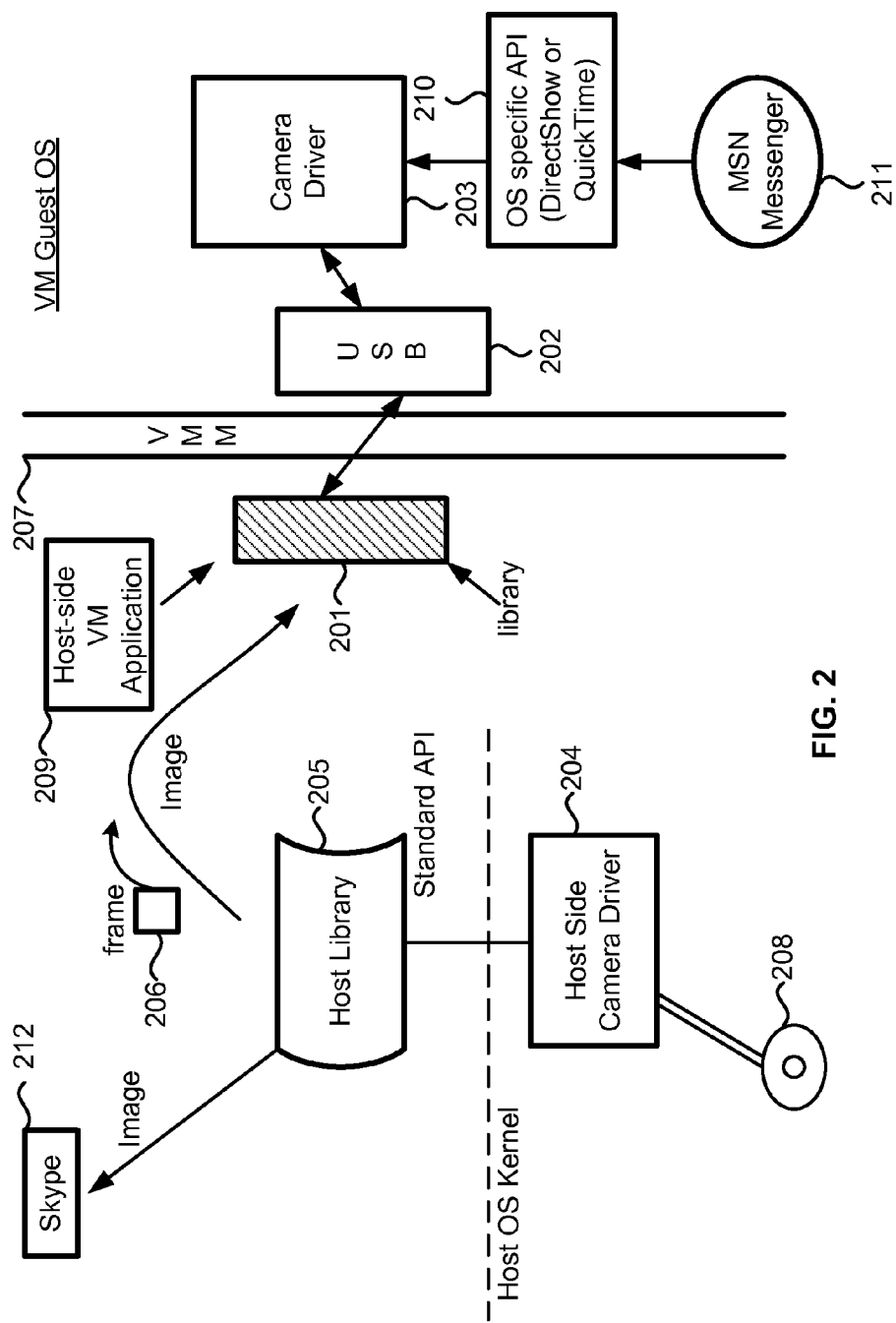
FIG. 2 illustrates a system for sharing a Host USB video camera, in accordance with the exemplary embodiment.

FIG. 2 further illustrates a system for sharing a Host USB video camera, in accordance with the exemplary embodiment. According to the exemplary embodiment, a standard USB video camera 208 is build into a Host system 20. At least one VM running a Guest OS is launched on the Host system 20. The Guest OS has a virtual camera driver 203 implemented in it for the Host USB video camera 208. The virtual camera driver 203 is connected to a virtual USB bus 202.

The virtual driver 203 uses a OS specific API 210 QuickTime or similar interfacing to a MSN Messenger 211 (or SKYPE or similar). The virtual USB 202 communicates with a special Host library 201 over a Virtual Machine Monitor (VMM) 207. A special proprietary Host-side VM application 209 acquires and processes video data from a standard Host system video processing library (API) 205 that communicates directly with a Host-side camera driver 204, i.e., the driver is on the Host side, such that QuickTime in the Host communicates with the camera.] The video processing library (API) 205 can be, for example, an Apple Library (in case of Mac OS Host, e.g., Mac OS version 10.4). Video frames 206 are provided via the Host-side VM application 209 to the virtual USB bus 202 and to the virtual driver 203.

The video processing library 205 provides images to the library 201 connected to the virtual USB bus 202. Meanwhile, Host application 212 or other VMs (not shown) can simultaneously acquire video streams from the Host USB camera 208. According to the exemplary embodiment, the library 205 can provide a certain video resolution upon request from the Guest OS (i.e., the virtual camera driver 203). Additionally, the Guest OS can request a certain frame frequency as well, for example, because of settings in the VM, or software previously installed in VM might require particular webcam parameters. The parameters are met by transforming real video frames to virtualized USB frames.

Figure 3:
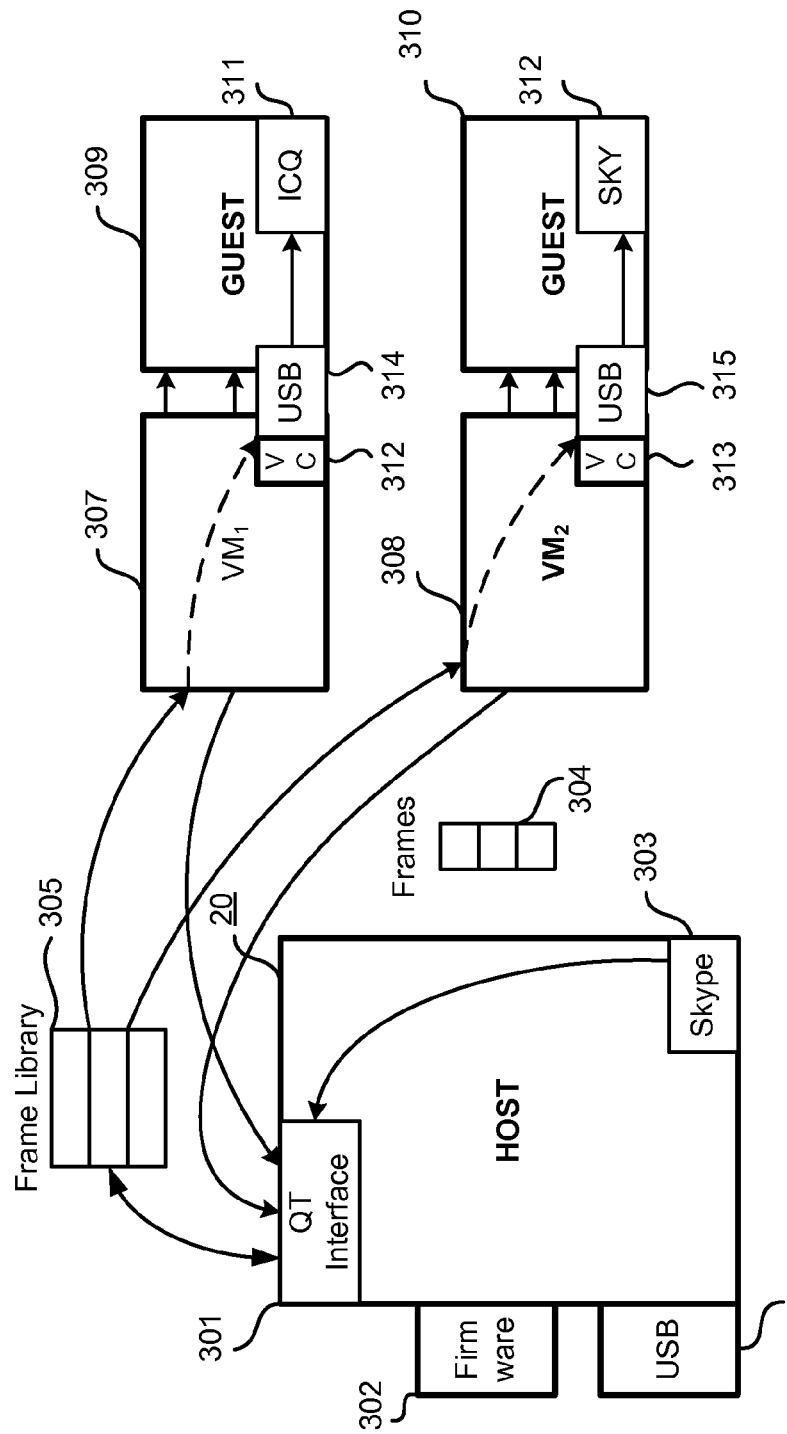
FIG. 3 illustrates a method for virtualization of a Host USB video camera on multiple VMs, in accordance with the exemplary embodiment.

FIG. 3 illustrates a method for virtualization of a Host USB video camera on multiple VMs, in accordance with the exemplary embodiment. A Host 20 has a USB bus 304 with a video camera connected to it. The Host 20 has a standard set of firmware 302 and QT-push interface 301. The Host 20 has VM 307 and VM 308 implemented on it. The VM 307 has a Guest OS 309 running on it and the VM 307 has a Guest OS 310 running on it.

The Guest OS 307 requires video access for ICQ (or similar) application 311 and the Guest OS 308 requires video access for SKYPE (or similar) application 312 (or any other video conferencing application). Therefore, both the Guest OS 309 and the Guest OS 310 need to use the Host USB video camera. The Guest OS 309 has a virtual USB bus 314 implemented on it. The Host USB camera 312 is virtualized under the Guest OS 309. Analogously, the Guest OS 310 has a virtual USB bus 315 implemented on it. The Host USB camera 313 is virtualized under the Guest OS 309. Preferably, a web camera USB driver is installed inside the VM. It communicates with software supported by the Guest OS. Since the USB driver could not use real USB data, the camera for each of the VMs is virtualized. It may be processed inside VM or partially inside Host, and partially inside the VM. For example, video frames for further conversion are generated in the Host and then are transmitted to VM using a triple buffering technique.

The virtual USB buses 314 and 315 send video requests to the Host QT-push interface 301. The Host QT-push interface 301 pushes video frames 304 from the Host USB camera into the frame library 305. Then the video frames are provided to the virtual USBs 314 and 315. Subsequently, the video frames 304 are rendered by the virtual video cameras 312 and 313. The video stream is provided to Guest applications 311 and 312 respectively.

Meanwhile, a Host application 303 can also acquire a video stream from the QT-push interface 301 and the frames 304 will be pushed to the Host video application 303 as well. Therefore, virtualization of the Host USB camera 208 on the VMs 307 and 308 advantageously allows for effective sharing of the Host USB camera 208. Note that the virtual USB cameras 312 and 313 are supported by the Host OS and not by the USB protocol. The USB data stream is emulated for the VM. For example, if the VM is portable, the VM generalized for every Host.

Those skilled in the art would appreciate that the exemplary embodiment allows for simultaneous use of the Host USB camera by the plurality of the VMs and the Host itself without switching between the VM contexts and installation of the special drivers, and without dedicating the camera to a single environment (host or virtual).

Figure 4:
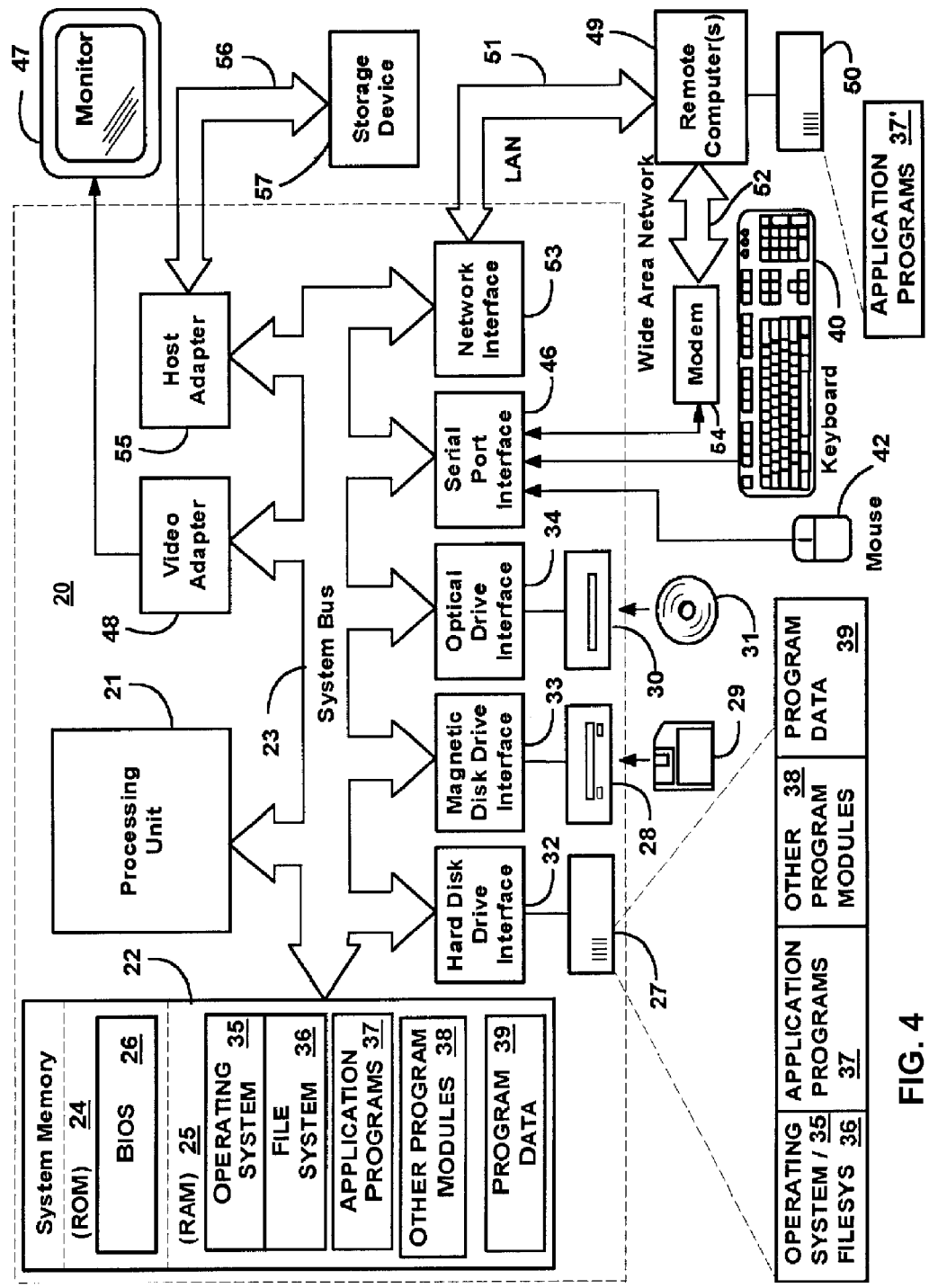
FIG. 4 illustrates an exemplary computer system where the embodiments described herein can be implemented.
Figure 5:
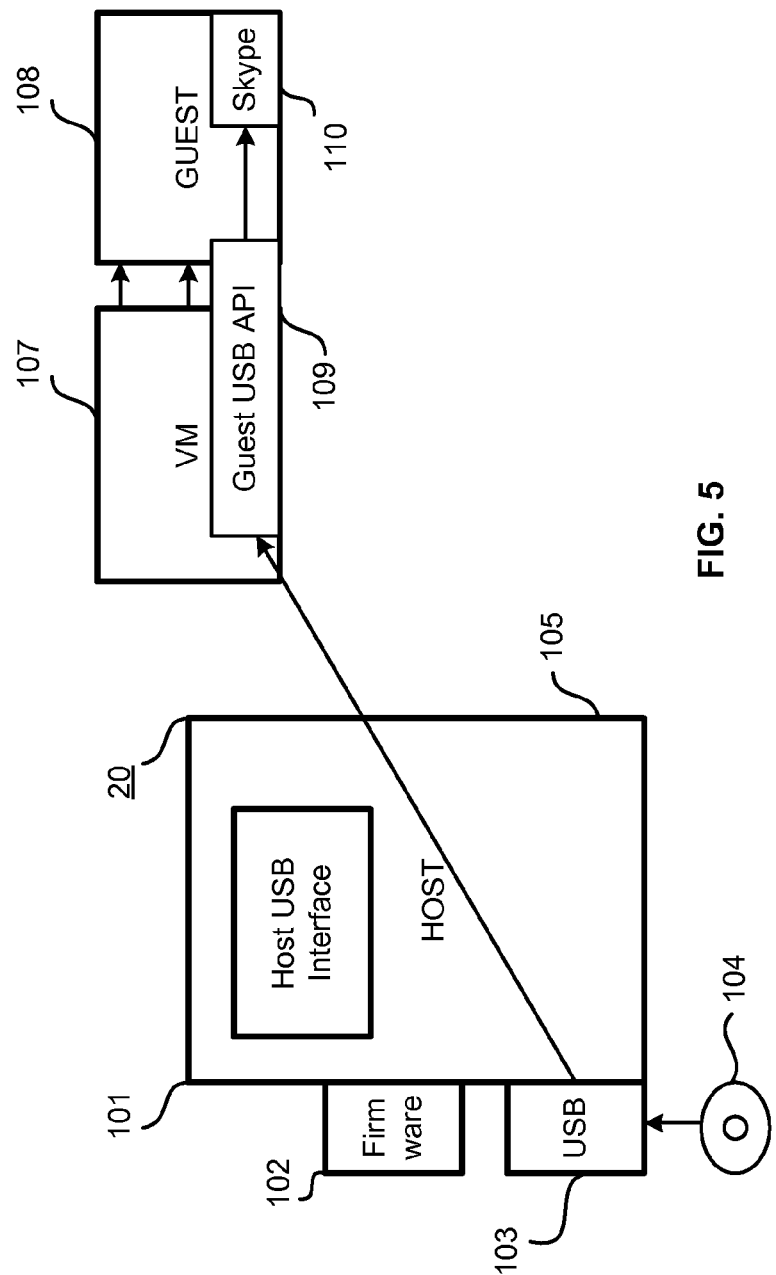
FIG. 5 illustrates a conventional system providing for a dedicated use of a USB video camera in a VM.

With reference to FIG. 4, an exemplary system for implementing the invention includes a general purpose computing device in the form of a Host computer 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer/server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 120.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, 37', other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for sharing a USB camera between Virtual Machines (VMs) and a host, the system comprising:
   a processor;
   a memory coupled to the processor;
   a host system having a host OS executed on it and a USB camera installed;
   at least one VM running on the host OS;
   a Guest OS running on the VM;
   a Virtual Machine Monitor (VMM) for passing video frames from the host OS to the VM;
   a video-rendering application executed on the Guest OS;
   at least one video-rendering application executed on the host OS;
   a standard video library implemented on the host OS for processing the video stream;
   a video processing module running on the host OS;
   a camera driver for controlling the USB camera installed on the host OS;
   a host frame library for collecting video frames from the USB camera;
   a virtual USB bus for connecting to the host frame library implemented on the Guest OS;
   a virtual camera with a virtual driver implemented on the Guest OS,
   wherein:
     the virtual USB bus sends video requests to the host frame library and receives video frames via VMM; and
     the host frame library provides the video frames simultaneously to all virtual video cameras, which then pass the video frames to the rendering applications executed under the Guest OSs.

2. The system of claim 1, wherein the video processing module running on the host OS provides support for USB camera virtualization on the Guest OS.

3. The system of claim 1, wherein the video-rendering application is any of:
Skype;
ICQ; and
video conferencing.

4. The system of claim 1, wherein the host video library provides a certain video resolution and a frame frequency to the VM upon request.

5. The system of claim 1, wherein the virtual driver uses a VM OS specific API to interface to MSN Messenger.

6. The system of claim 1, wherein the video frames are provided by a QT-push interface implemented on the host.

7. The system of claim 1, wherein the host frame library is a standard MAC OS library.

8. The system of claim 1, wherein the video frames are triple buffered in the host frame library.

9. The system of claim 8, wherein the video frames are converted from a shared camera video API to a VM format, and a file containing the frames is created and mapped to a shared file system.

10. The system of claim 9, wherein the file is mapped to any of RAM and an HDD cache.

11. The system of claim 10, wherein the file a header area and a plurality of data sectors representing the video frames.

12. The system of claim 11, wherein the VM buffers the video frames from the shared camera and transmits them as soon as the VM is connected.

13. The system of claim 12, wherein when the VM is suspended, the Host collects video frames and writes the frames to parts of buffers marked by the VM as "free".

14. The system of claim 1, wherein the shared camera is started by a command generated from VM.

15. The system of claim 1, wherein resolution parameters are converted from physical camera to virtual camera.

16. The system of claim 1, wherein frame rate parameters are converted from physical camera to virtual camera.

17. The system of claim 1, wherein color space parameters are converted from physical camera to virtual camera.

18. A method for sharing a USB camera between Virtual Machines (VMs) and a host, the method comprising:
launching at least one Virtual Machine (VM) on a host OS;
starting a Guest OS on the VM;
launching a video-rendering application on the Guest OS;
instantiating a video-rendering application on the host OS;
activating a Virtual Machine Monitor (VMM) for providing interface between the VM and the USB camera;
emulating the USB camera with a virtual driver on the Guest OS;
instantiating a virtual USB bus on the Guest OS;
sending a video request to a host standard video library from the virtual USB bus over the VMM;
receiving video frames from a host frame library via the virtual USB bus under control of the VMM;
providing the video frames to the virtual camera; and
providing the video frames from the host frame library simultaneously to all virtual video cameras, and then passing the video frames to the rendering applications executed under the Guest OSs.

19. The method of claim 18, wherein the video-rendering application is any of:
Skype;
ICQ; and
video conferencing.

20. The method of claim 18, wherein the sending of the video request includes desired video resolution and frame frequency.

21. A system for sharing a USB camera between Virtual Machines (VM) and a host, the system comprising:
a processor;
a memory coupled to the processor;
a computer program logic stored in the memory and executed on the processor, the computer program logic for implementing the steps of:
launching at least one Virtual Machine (VM) on a host OS;
starting a Guest OS on the VM;
launching a video-rendering application on the Guest OS;
instantiating a video-rendering application on the host OS;
activating a Virtual Machine Monitor (VMM) for providing interface between the VM and the USB camera;
emulating the USB camera with a virtual driver on the Guest OS;
instantiating a virtual USB bus on the Guest OS;
sending a video request to a host standard video library from the virtual USB bus over the VMM;
receiving video frames from a host frame library via the virtual USB bus under control of the VMM;
providing the video frames to the virtual camera; and
providing the video frames from the host frame library simultaneously to all virtual video cameras, and then passing the video frames to the rendering applications executed under the Guest OSs.

* * * * *